3,273,957
METHOD OF RETARDING WATER SURFACE EVAPORATION
Nicky Beredjick, Chicago, Ill., assignor to Standard Oil Company, Chicago, Ill., a corporation of Indiana
No Drawing. Filed June 28, 1962, Ser. No. 205,878
7 Claims. (Cl. 21—60.5)

This invention relates to a method for retarding water surface evaporation. Particularly, it relates to an improved method for retarding the evaporation of water from large open bodies thereof, especially from reservoirs having extended surfaces normally in contact with the atmosphere; and more particularly relates to an improved evaporation retardant composition and method of applying such composition to the extended water surface to form and maintain a film of a water-insoluble evaporation retardant thereon. The problem of reducing water surface evaporation to reduce the loss of water is old and well-known. The covering of the surface of water reservoirs is a challenging problem when one considers the area to be covered and related problems.

Certain organic compounds are capable of forming monomolecular films on water surfaces and thus present a barrier to evaporation of water. Various long-chain aliphatic water-insoluble alcohols have been found to be the most effective evaporation retardants. Such alcohols are decanol, dodecanol, tetradecanol, hexadecanol, octadecanol, eicosanol, docosanol and tetracosanol. Hexadecanol and octadecanol are the preferred alcohols for the formation of substantially monomolecular films on water surfaces to retard evaporation. However, such long-chain water-insoluble fatty alcohols are solids at normal application temperatures. Consequently, while such alcohols are self-spreaders, and are capable of forming a film over a period of time, it is extremely difficult to obtain effective distribution of these alcohols on the surfaces of large bodies of water in a simple manner.

Numerous techniques have been suggested and tried for distributing these materials so that they can form a film over the surface of the water in a minimum amount of time. For example, the solid alcohols were scattered in the solid state in the form of flakes, pellets, etc.; but this resulted in very poor distribution of the material over the water surface. A suggested improvement of this method, known as bulk distribution, was to powder the solid alcohols, thereby increasing the surface area and thus increase the rate of film formation. Here again it was extremely difficult to suspend and distribute the finely divided solids on the water surface and thereby maintain an effective barrier against evaporation. The addition of surfactants to the powdered solid alcohols in an attempt to assist in the bulk distribution of such solids was ineffectual. When another suggested technique, to liquefy the fatty alcohols, and by spraying the liquefied material on the water surface, thereby forming small droplets on the surface of the water with resultant film formation. The use of solvents such as ethyl alcohol, kerosene, and other petroleum fractions has been suggested for distributing a long-chain water insoluble alcohol over the water surface. The suggested concentrations of the water-insoluble alcohol were such that the solution application destroyed the film forming properties and also caused precipitation of the water-insoluble alcohol in the supply containers under the widely varying temperatures existent during storage and application. Consequently, the solution application of the desired film forming alcohols was abandoned.

Contrary to the teachings of the prior art with respect to the use of solvents for applying $C_{12}$ to $C_{24}$ aliphatic alcohols to water surfaces, it has been discovered that when such water insoluble alcohols are dissolved in a water-miscible alcohol having 1 to 5 carbon atoms there is produced a water evaporation retardant composition that overcomes the deficiencies of the prior art usage of such water insoluble alcohols without detrimentally affecting the film forming properties of such long-chain aliphatic alcohols. The water evaporation retardant composition of this invention comprises from about 0.01 to about 2% by weight of the total composition of a long-chain $C_{12}$ to $C_{24}$ aliphatic alcohol dissolved in a $C_{1-5}$ water-miscible alcohol. The water-miscible alcohol facilitates the distribution of the water-insoluble alcohol on the water surface and together with said water-insoluble alcohol forms a film on the surface of the water, whereby the rate of evaporation of water from such surface is retarded.

The water-insoluble alcohols used in this invention are the long-chain fatty aliphatic alcohols containing 12 to 24 carbon atoms and preferably those containing 16 to 18 carbon atoms, such as hexadecanol or octadecanol, that is, cetyl alcohol and stearyl alcohol, as hereinbefore enumerated. The preferred long-chain alcohols are the saturated alcohols containing an even number of carbon atoms. The water-miscible alcohols are the straight or branched short-chain saturated $C_{1-5}$ alcohols; namely, methanol, ethanol, propanol, butanol and pentanol.

The application of the evaporation retardant composition of this invention is accomplished simply by placing the composition on the surface of the water. When the composition is applied to the surface, it immediately begins to form a film. The aplication of the composition can be accomplished in a number of ways, such as by spraying, floating on, dripping or any combination of these so as to give a regulated and continual make-up as required under the conditions at hand. Generally, the amount of the composition to be applied to the surface of the water can be determined by mere routine tests by one skilled in the art in possession of this disclosure, bearing in mind the extent and duration of protection desired. Since the object of covering the water surface with the composition is to form a substantially monomolecular film of the composition, the amount of the composition that is added to the water surface will depend upon weather conditions, wind velocity and other circumstances. Specific amounts of the evaporation retardant composition are not critical.

The evaporation retardancy of the water retardant composition of this invention is illustrated in the following example. The effectiveness was ascertained in the following manner. Approximately 50 ml. of water was placed in crystallizing dishes (three-inch diameter) and the surface of the water therein covered with hexadecanol and octadecanol, either solid or alcoholic solution. Appropriate controls containing approximately 50 ml. of water and 0.2 ml. of the respective alcohol on the surface were prepared. All dishes were weighed and then placed in a humidity cabinet equipped with a small exhaust fan for circulating air through the cabinet. The humidity inside of the cabinet was maintained at 35 to 40% by use of indicating Drierite, placed in trays along the walls of the cabinet. The amount of water evaporated was ascertained by periodic weighings of the test dishes, and the grams of water lost was noted. The average loss for the blank (uncovered) and the test (covered) samples was ascertained. The average percent reduction in water evaporation due to covering the water surface with solid octadecanol and the water evaporation retardant composition of this invention is shown for respective hours of exposure in the humidity cabinet in the following examples.

*Example I*

Ethyl alcohol and isopropyl alcohol solutions containing 0.1% and 2% octadecanol were prepared. 0.2 ml. of the respective solutions were placed in the dishes on the water surfaces of the tests. Solid octadecanol was also spread in bulk to compare bulk distribution with the solvent method of this invention. The percent reduction in water evaporation is shown in Table I.

TABLE I

| Exposure Hours | Solid, 2.4 mg. | Percent Reduction in Water Evaporation | | | |
|---|---|---|---|---|---|
| | | 0.1% | 2.0% | 0.1% | 2.0% |
| 8 | 52 | | | | |
| 18 | | | | 42 | |
| 19 | | | 51 | | |
| 22 | | | | 43 | |
| 23 | | 36 | | | |
| 24 | | | | | 46 |
| 45 | | | | 44 | |
| 48 | | | 38 | | 41 |
| 74 | | | 41 | | |
| 78 | | | | | 40 |
| 88 | 34 | | | | |
| 90 | | | | 38 | |
| 95 | | 36 | | | |
| 139 | | | 40 | | |
| 143 | | 20 | | | 41 |
| 144 | 16 | | | | |

*Example II*

Alcoholic solutions containing 0.1% hexadecanol and 0.1% octadecanol were prepared and tested in the above described manner. Results for the respective alcoholic solutions are shown in Table II.

TABLE II

| Solvent | Time of Exposure (hrs.) | Hexadecanol Percent Reduction of Water Evaporation | Octadecanol Percent Reduction of Water Evaporation |
|---|---|---|---|
| MeOH | 18 | | 33 |
| MeOH | 42 | | 31 |
| n-PrOH | 22 | 19 | 36 |
| n-PrOH | 28 | 17 | 32 |
| n-PrOH | 46 | 20 | 31 |
| iso-Pr-OH | 4 | 26 | 46 |
| iso-Pr-OH | 22 | 27 | 44 |
| iso-Pr-OH | 48 | 23 | 38 |
| n-BuOH | 17 | 20 | 40 |
| n-BuOH | 23 | 21 | 38 |
| n-BuOH | 49 | 19 | 35 |
| iso-BuOH | 18 | 20 | 33 |
| iso-BuOH | 42 | 16 | 25 |
| iso-BuOH | 49 | 12 | 32 |
| n-Amyl-OH | 41 | 19 | 37 |
| iso-Amyl-OH | 17 | 23 | 37 |
| iso-Amyl-OH | 23 | 21 | 34 |
| iso-Amyl-OH | 99 | 15 | 29 |

The above data show that by covering a water surface with an alcoholic solution of a long-chain aliphatic alcohol there is no detrimental effect upon the film forming properties of the long-chain aliphatic alcohol and that with octadecanol there is an improvement in the percent reduction in water evaporation. Thus, the present invention provides an improved procedure for covering water surfaces with a water evaporation retardant which permits a simple and effective distribution of the retardant material over the water surface.

Thus, having described the invention, what is claimed is:

1. In the method for retarding the evaporation of water from an evaporating surface thereof which comprises forming and maintaining an evaporation retardant film of a water-insoluble $C_{12-24}$ aliphatic alcohol on said evaporating surface, the improvement consisting of forming said film by applying to said evaporating surface a liquid solution consisting of about 0.01–2 percent by weight of the total composition of said $C_{12-24}$ aliphatic alcohol dissolved in a $C_{1-5}$ alkanol.

2. The method of claim 1 wherein said water-insoluble alcohol is hexadecanol.

3. The method of claim 2 wherein said alkanol is ethanol.

4. The method of claim 2 wherein said alkanol is isopropanol.

5. The method of claim 1 wherein said water-insoluble alcohol is octadecanol.

6. The method of claim 5 wherein said alkanol is ethanol.

7. The method of claim 5 wherein said alkanol is isopropanol.

References Cited by the Examiner

UNITED STATES PATENTS

| | | | |
|---|---|---|---|
| 2,878,098 | 3/1959 | Treloar et al. | 21—60.5 |
| 2,903,330 | 9/1959 | Dressler | 21—60.5 |
| 3,154,505 | 10/1964 | Watanabe | 21—60.5 |

MORRIS O. WOLK, *Primary Examiner.*

E. SZOKE, F. W. BROWN, *Assistant Examiners.*

UNITED STATES PATENT OFFICE
CERTIFICATE OF CORRECTION

Patent No. 3,273,957 September 20, 1966

Nicky Beredjick

It is hereby certified that error appears in the above numbered patent requiring correction and that the said Letters Patent should read as corrected below.

Column 3, in TABLE I, second column, under the heading "Solid, 2.4 mg." line 1, thereof, for "52" read -- 42 --; same TABLE, columns 3 and 4, above "0.1% and 2.0%" insert -- In Ethyl Alcohol --; same TABLE, columns 5 and 6, above "0.1% and 2.0%" insert -- In Iso-Propyl Alcohol --.

Signed and sealed this 22nd day of August 1967.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,273,957                            September 20, 1966

Nicky Beredjick

It is hereby certified that error appears in the above numbered patent requiring correction and that the said Letters Patent should read as corrected below.

Column 3, in TABLE I, second column, under the heading "Solid, 2.4 mg." line 1, thereof, for "52" read -- 42 --; same TABLE, columns 3 and 4, above "0.1% and 2.0%" insert -- In Ethyl Alcohol --; same TABLE, columns 5 and 6, above "0.1% and 2.0%" insert -- In Iso-Propyl Alcohol --.

Signed and sealed this 22nd day of August 1967.

(SEAL)
Attest:

ERNEST W. SWIDER                         EDWARD J. BRENNER
Attesting Officer                          Commissioner of Patents